United States Patent [19]

Bannai

[11] Patent Number: 4,966,334
[45] Date of Patent: Oct. 30, 1990

[54] CABLE REEL

[75] Inventor: Hiroyuki Bannai, Miyagi, Japan

[73] Assignee: Alps Electric Co., Ltd., Tokyo, Japan

[21] Appl. No.: 311,996

[22] Filed: Feb. 16, 1989

[30] Foreign Application Priority Data

Apr. 18, 1988 [JP] Japan ............................ 63-50845[U]

[51] Int. Cl.⁵ ............................................ H01R 35/00
[52] U.S. Cl. .......................................... 242/85; 439/15
[58] Field of Search ................. 242/85, 54 R; 439/15, 439/16

[56] References Cited

U.S. PATENT DOCUMENTS

| 3,657,491 | 4/1972 | Ryder et al. | |
| 4,451,105 | 5/1984 | Sakurai | |
| 4,735,573 | 4/1988 | Zeller et al. | 439/15 |
| 4,797,109 | 1/1989 | Wende | 439/15 |

Primary Examiner—Stuart S. Levy
Assistant Examiner—Steven M. duBois
Attorney, Agent, or Firm—Guy W. Shoup; Paul J. Winters

[57] ABSTRACT

A cable reel which electrically connects a fixed portion and a movable portion using a flexible strip cable wound numerous times and received between the fixed portion and the movable portion is provided. A plurality of engaging portions are formed as predetermined gaps around the circumference of the fixed portion. A stopper member projects outside the movable portion and elastically presses toward the engaging portion so that the engaging portion engages the stopper member, thereby locking rotation of the movable portion. The engagement of the stopper and the engaging portion is automatically released, and it is possible to freely rotate the movable portion when the cable reel is assembled with a rotating mechanism.

4 Claims, 3 Drawing Sheets

CABLE REEL

FIELD OF THE INVENTION

The present invention provides a cable reel for electrically connecting a fixed housing and a movable housing which is rotatably mounted on the fixed housing using a strip type cable such as a flat cable, etc., and particularly to providing a cable reel suitable for using with the steering device of a motor vehicle.

BACKGROUND OF THE INVENTION

A cable reel allowing electrical connection between a fixed housing and a movable housing has been used with a rotating mechanism such as the steering column of a motor vehicle. It is desirable to mount this cable reel on a steering column so that the movable housing can be rotated by the same force in both directions from the center position of the steering column. Prior art arrangements for correctly mounting the cable reel on the rotating mechanism use an index marking to correctly position the fixed housing and the movable housing. The position fitting mechanism of the prior art also provide a gear mounted on the movable housing which is engaged with a gear mounted on the fixed housing, such that the movable housing can only be rotated through a predetermined angle. The two gears comprise a locking member One gear of the locking member is mounted on the movable housing, while the other gear of the locking member is held to the fixed housing by a snap ring. After completing assembly of the entire rotating mechanism, the locking member can be separated from the cable reel (Japanese Laid-Open Publication No. 62-18355). The gear mounted on the fixed housing is equipped with a special tooth which can prevent rotation of the movable housing. Markings are provided for correctly positioning the two gears relative to each other. In this way the cable reel can be assembled on the rotating mechanism, such as a steering device, in its central position.

The locking member as described above is made of a hard substance such as plastic material, and thus after assembling the cable reel with the rotating mechanism, if the rotating mechanism is moved without the locking member being separated therefrom, it is impossible to rotate the movable housing past a certain point. At that time, if the movable housing is rotated by excessive force during checking after assembly, the components of the fixed housing engaged with the locking member may be broken and the broken pieces will inconveniently remain in the case, causing strange sounds during operation.

After the cable reel is assembled with the rotating mechanism, in light of the relationship between the cable reel and the other components assembled along with the cable reel, it may become necessary to remove the cable reel during maintenance, which is very inconvenient. The locking member must be replaced and the cable reel must be remounted. Thus, during remounting after replacing the locking member, even though the movable housing is correctly positioned relative to the fixed housing, it is possible for the movable housing to be displaced from its original position. Therefore, the cable reel and the rotating mechanism may be incorrectly assembled.

SUMMARY OF THE INVENTION

The present invention is constructed to correct these disadvantages of prior art cable reels. The object of the present invention is to provide a cable reel in which the movable housing is locked relative to the fixed housing when the cable reel is removed from the rotating mechanism for maintenance so that remounting is required. Furthermore, the cable reel should automatically release from the locked state when assembled with the rotating mechanism.

In order to accomplish the above object, the cable reel includes a fixed housing, a movable housing rotatably mounted on the fixed housing and a flexible strip cable received between the fixed housing and the movable housing. The cable is wound numerous times and electrically connects the fixed housing and the movable housing. Engaging portions are formed as predetermined gaps on the periphery of the fixed housing. A stopper member which can be operated from the outside the movable housing elastically presses to engage the engaging portion. Rotation of the movable housing is prevented when the stopper member engages the engaging portion.

During assembly, the movable housing, positioned at a predetermined point relative to the fixed housing, is restricted in its rotation because the stopper member engages the engaging portion. Thus, during mounting of the cable reel onto the rotating mechanism, the movable housing may be prevented from undesirable rotation and locked in a predetermined position. On the other hand, after the cable reel is assembled with the rotating mechanism, the stopper member is separated from the engaging portion against an elastic force by means of the steering shaft component of the rotating mechanism. Accordingly, the locked state of the movable housing is automatically released and it is possible to smoothly rotate the movable housing relative to the fixed housing.

If the cable reel assembled with the rotating mechanism is removed and mounted again, elastic force again causes the stopper to engage with the engaging portion. Accordingly, the movable housing is securely locked in place and cannot be dislocated during the remount.

BRIEF DESCRIPTION OF THE DRAWINGS

The above and further objects, features, and advantages of the present invention will become more apparent from the following description with reference to the accompanying drawings.

FIG. 1 to FIG. 4 show one embodiment of the present invention.

FIG. 1 is a crossectional view of a cable reel.

FIG. 2 is a view illustrating the engaging portion.

DETAILED DESCRIPTION OF THE INVENTION

Figure 1:
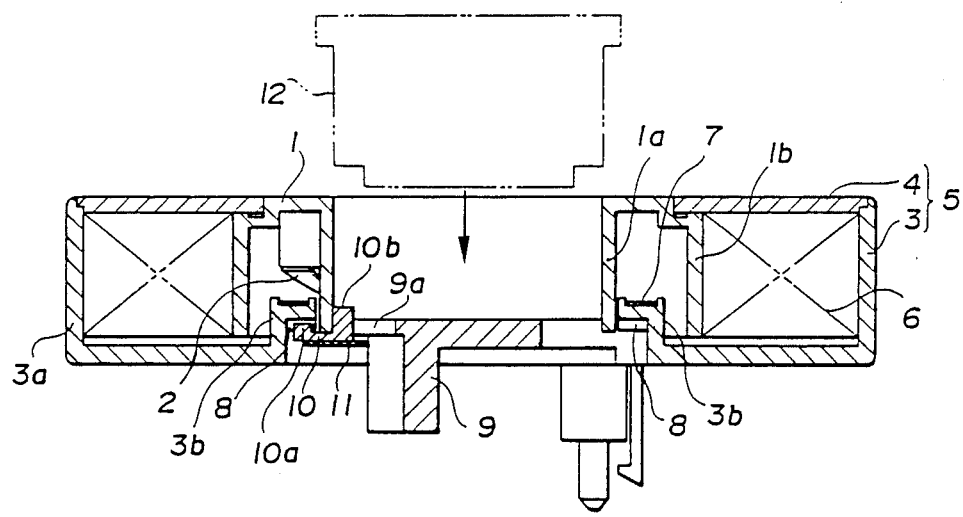

FIG. 1 is a crossectional view of a cable reel according to the first embodiment of the present invention. Movable housing 1 is provided with rotating barrel 1a mounted on its center and inner wheel wall 1b mounted on a concentric circle relative to rotating barrel 1a. Slider 2 is supported on the inner wall of movable housing 1 and each slider 2 is constructed to rotate while in contact with the conductor board 7 as described below. Outer barrel body 3 has outer wheel wall 3a on its periphery, the upper surface of which is opened. Cover 4 opens and closes over the opened portion. Fixed housing 5 comprises outer barrel body 3 and cover 4. Movable housing 1 is rotatably supported at the center of fixed housing 5. Flat cable 6 is wound a number of times between inner wheel wall 1b and outer wheel wall 3a. Well known flat cable 6 includes a number of copper conductors laminated by a flexible film such as PET, etc.. The inner end of flat cable 6 is turned near inner wheel wall 1b, and then is introduced out of movable housing 1. The outer end of the flat cable 6 is turned near outer wheel wall 3a and is introduced to fixed housing 5 from the outside.

Figure 2:
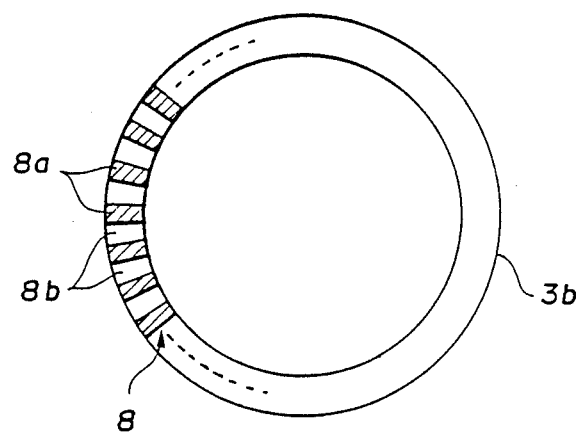

Projector 3b, which has an angular form, is integrally formed on the center of outer barrel body 3. Conductor board 7 in the form of a ring, is made of a copper plate and arranged on the upper surface of projector 3b. Engaging portion 8 is formed on the lower surface of projector 3b. As indicated in FIG. 2, engaging portion 8 is provided with convex portions 8a that are indicated by hatched lines. Convex portions 8a and concave portions 8b are continuously formed in turn along a circumferential line of fixed housing 5.

Support 9 is securely fixed to rotating barrel 1a of movable housing 1, and stopper 10 is elastically supported by means of leaf spring 11 mounted on supporter 9. Stopper 10 is provided with projecting portion 10a, formed to extend into rotating barrel 1a, and pressing portion 10b, formed to extend out of rotating barrel 1a. Pressing portion 10b is positioned within cut-away portion 9a of supporter 9, so that its movement in the circumferential direction is limited. When projecting portion 10a presses against engaging portion 8 because stopper 10 is pressed upwardly in the drawings by leaf spring 11, projecting portion 10a engages any concave portion 8b. Thus, in this state it is impossible to rotate movable housing 1.

The cable reel belonging to this embodiment is schematically constructed as described above. The following explanation describes its operation.

Figure 3A:
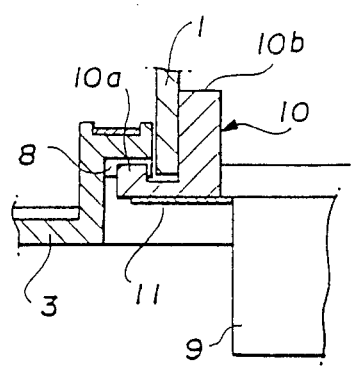
FIG. 3a is a front crossectional view representing the locked state of the movable housing.
Figure 3B:
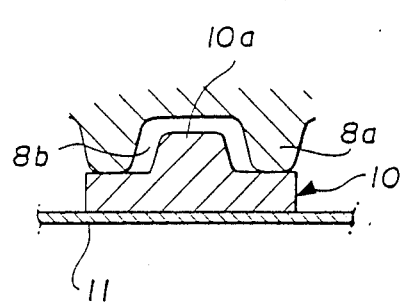
FIG. 3b is a side crossectional view of the movable housing.
Figure 4A:
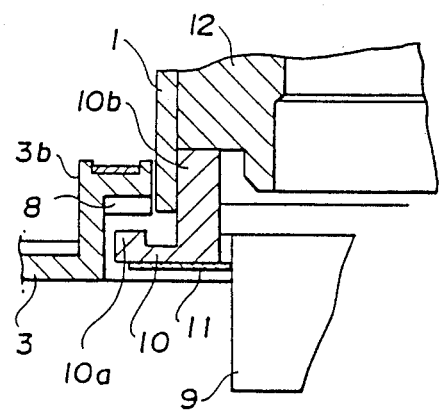
FIG. 4a is a front crossectional view representing the unlocked state of the movable housing.
Figure 4B:
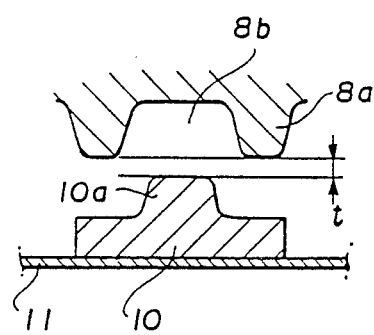
FIG. 4b is a side crossectional view of a portion of the movable housing.

Firstly, movable housing 1 and fixed housing 5 and flat cable 6 are assembled as illustrated in FIG. 1. In this case, as shown in FIGS. 3a and 3b projecting portion 10a of stopper 10 is elastically forced by leaf spring 11 to engage concave portion 8b of engaging portion 8. As a result, the rotation of movable housing 1 is hindered when projecting portion 10a encounters convex portion 8a. To complete assembly, rotating shaft 12 is inserted from the upper portion of rotating barrel 1a and pressing portion 10b of stopper 10 is pushed against the elastic force of leaf spring 11, as shown in FIGS. 4a and 4b. The predetermined clearance is formed between projecting portion 10b of stopper 10 and convex portion 8a of engaging portion 8. As a result, it is possible to rotate movable housing 1. Herein, movable housing 1 is rotated till arriving at the center position by means of a positioning mechanism (not shown)

If the pressing force exerted on pressing portion 10b is removed by removing rotating shaft 12 as shown in FIGS. 3a and 3b, projecting portion 10a is pressed by leaf spring 1 to again engage with engaging portion 8. Consequently, movable housing 1 is again maintained in the locked state. Thus, during transfer of the completely assembled cable reel to a rotating mechanism, movable housing 1 is prevented from rotating, which allows correct assembly with a rotating mechanism such as a steering column.

On the other hand, once the cable reel described above is assembled with a rotating mechanism such as a steering column, etc., rotating shaft 12, is inserted into rotating barrel 1a of movable housing 1, so that pressing portion 10b of stopper 10 may be pushed downward by rotating shaft 12 as shown in FIGS. 4a and 4b. At that time, as described above, projecting portion 10a of stopper 10 is separated from engaging portion 8. It is possible to freely rotate movable housing 1 after assembling the mechanism because the locked state of movable housing 1 is automatically released. In this case, when rotating the steering column the electrical connection between movable housing 1 and fixed housing 5 is maintained through flat cable 6. Also, during rotation of movable housing 1, slider 2 is moved in contact with the upper portion of conductor board 7 installed on projector 3b. The slip ring, including slider 2, and conductor board 7 can also maintain an electrical connection between movable housing 1 and fixed housing 5. According to this invention, the engaging portion 8 and the stopper member 10 are disposed inside the cable reel and in the vicinity of the slip ring of slider 2, so that the engaging portion 8, stopper member 10, slip ring of slider 2 and conductor board 7 can be arranged in a compact, neat manner, thus enabling the overall size of the cable reel to be reduced.

Furthermore, it may be desired that after the cable reel is mounted on the rotating mechanism, and after properly rotating movable housing 1, the cable reel is again removed from the rotating mechanism. In this case, the cable reel is removed from rotating shaft 12 with movable housing 1 being centrally positioned. Stopper 10 is returned from the state of FIG. 4 to the state of FIG. 3, and rotation of movable housing 1 is locked by stopper 10 and engaging portion 8. Therefore, movable housing 1 is prevented from losing its position during remounting.

Figure 5:
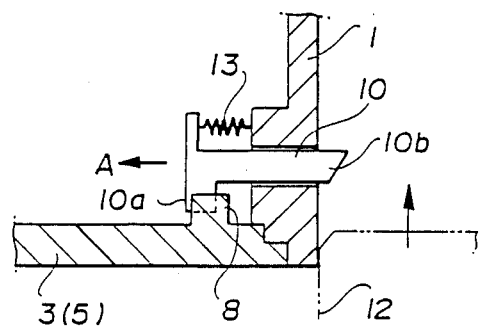
FIG. 5, FIG. 6, and FIG. 7 are crossectional views of the cable reel according to other embodiments of the present invention.
Figure 6:
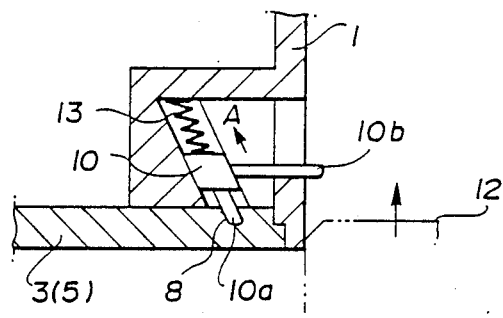
Figure 7:
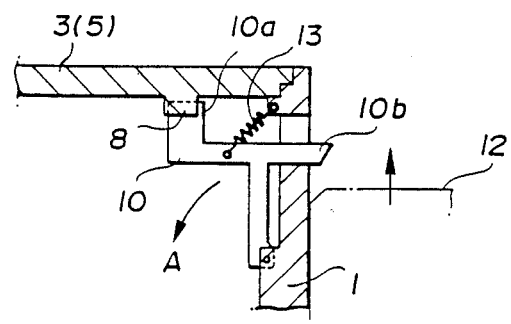

FIG. 5 to FIG. 7 show other embodiments of the present invention. The components corresponding to the embodiment of FIG. 1 to FIG. 4 have the same reference numbers.

In the embodiment of FIG. 5, stopper 10 is movably supported in the direction perpendicular to the axis line of movable housing 1. Also, stopper 10 is elastically biased by spring 13 in the direction for engaging projecting portion 10a with engaging portion 8. Thus, before assembling the cable reel with the rotating mechanism or when removing it therefrom, the rotation of movable housing 1 is locked by the engagement of projecting portion 10a with engaging portion 8. In mounting the cable reel on the rotating mechanism, rotating shaft 12 presses pressing portion 10b in the direction of arrow A in FIG. 5, against the elastic force of spring 13. As a result, the engagement of projection portion 10a and engaging portion 8 is released and movable housing 1 can freely rotate.

In the embodiment of FIG. 6, stopper 10 is slantly guided into movable housing 1 and elastically biased toward engaging portion 8 in the side of fixed housing 5 by spring 13. Engaging portion 8 has numerous grooves or holes formed on its circumference. Projecting portion 10a of stopper 10 is biased by spring 13 and engages with any groove or hole of engaging portion 8, so that rotation of movable housing 1 is restricted. When assembling the cable reel with the rotating mechanism, rotating shaft 12 forces stopper 10 to slide in the direction of arrow A in FIG. 6 by contacting pressing portion 10b. Consequently, the engagement of projection portion 10a and engaging portion 8 is automatically released, and movable housing 1 can be freely rotated.

In the embodiment of FIG. 7, stopper 10 is rotatably supported on movable housing 1 and elastically biased toward engaging portion 8 by means of spring 13. Thus, if the cable reel is not assembled with the rotating mechanism, the rotation of movable housing 1 is restricted by engagement of projecting portion 10a of stopper 10 with any concave portion of engaging portion 8. If the cable reel is assembled with the rotating mechanism, rotating shaft 12 forces stopper 10 to rotate in the direction of arrow A in FIG. 7 by contacting pressing portion 10b. Therefore, the engagement of projecting portion 10a and engaging portion 8 is automatically released, and it is possible to freely rotate movable housing 1.

According to the present invention, when originally assembling or when remounting a cable reel on a rotating mechanism, it is possible to prevent assembly errors because movable housing 1 is locked in a predetermined position. When the cable reel and the rotating mechanism are assembled, the locked state of the movable housing is automatically released.

What is claimed is:

1. A cable reel of the type for installation on a rotating mechanism comprising:
    a fixed housing;
    a movable housing rotatably mounted on said fixed housing and defining a space therebetween;
    a strip cable flexibly wound and received between said space to electrically connect said fixed housing and said movable housing;
    an engaging portion formed along a circumferential line of said fixed housing;
    a stopper member extending from said space to outside said movable housing;
    means for elastically pressing said stopper member toward said engaging portion, whereby engagement of said engaging portion with said stopper member prevents rotation of said movable housing, said stopper member being automatically released from engagement with said engaging portion when said cable reel is installed on said rotating mechanism;
    a conductor positioned on said fixed housing; and
    a slip ring mounted on said movable housing such that said slip ring electrically contacts said conductor.

2. A cable reel according to claim 1 wherein said conductor is formed as a ring and mounted on said engaging portion.

3. A cable reel according to claim 1 wherein said stopper member is movably supported on said movable housing to extend and move perpendicular to the axis of rotation of said movable housing.

4. A cable reel according to claim 1 wherein said stopper member is rotatably supported on said movable housing, and said means for elastically pressing is a spring.

* * * * *